(12) United States Patent
Erban

(10) Patent No.: US 9,994,210 B2
(45) Date of Patent: Jun. 12, 2018

(54) METHOD AND DEVICE FOR ASCERTAINING OR EVALUATING A SETPOINT TRAJECTORY OF A MOTOR VEHICLE

(71) Applicant: Robert Bosch GmbH, Stuttgart (DE)

(72) Inventor: Andreas Erban, Loechgau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/186,788

(22) Filed: Jun. 20, 2016

(65) Prior Publication Data

US 2016/0375907 A1    Dec. 29, 2016

(30) Foreign Application Priority Data

Jun. 26, 2015   (DE) .................. 10 2015 211 926

(51) Int. Cl.
| | |
|---|---|
| *B60W 30/188* | (2012.01) |
| *B60W 40/068* | (2012.01) |
| *B60W 10/06* | (2006.01) |
| *B60W 10/08* | (2006.01) |
| *B60W 10/11* | (2012.01) |
| *B60W 20/12* | (2016.01) |

(52) U.S. Cl.
CPC ............ *B60W 10/06* (2013.01); *B60W 10/08* (2013.01); *B60W 10/11* (2013.01); *B60W 20/12* (2016.01); *B60W 2530/10* (2013.01); *B60W 2550/143* (2013.01); *B60W 2550/402* (2013.01); *B60W 2720/103* (2013.01); *Y02T 10/6286* (2013.01)

(58) Field of Classification Search
CPC ...... B60W 10/06; B60W 20/12; B60W 10/11; B60W 10/08; B60W 2720/103; B60W 2550/402; B60W 2530/10; B60W 2550/143; Y02T 10/6286
USPC ........................................................ 701/99
See application file for complete search history.

(56) References Cited

U.S. PATENT DOCUMENTS

2004/0097327 A1*  5/2004  Loeffler ................ B60W 10/06
                                                            477/15

FOREIGN PATENT DOCUMENTS

DE        102012200196        7/2013

OTHER PUBLICATIONS van Keulen, Thijs; de Jager, Brian; Foster, Darren; Steinbuch, Maarten; "Velocity trajectory optimization in Hybrid Electric trucks", Jun. 30-Jul. 2, 2010; 2010 American Control Conference; pp. 5074-5079.*

* cited by examiner

*Primary Examiner* — Brian P Sweeney
(74) *Attorney, Agent, or Firm* — Norton Rose Fulbright US LLP; Gerard Messina

(57) ABSTRACT

A method for ascertaining a setpoint trajectory of a motor vehicle, an initial setpoint trajectory being planned and transmitted to an evaluation unit, a curve of a power characteristic variable, which is implementable as a function of the initial setpoint trajectory, being received from the evaluation unit, and a corrected setpoint trajectory being determined therefrom as a function of the ascertained implementable curve of the power characteristic variable.

8 Claims, 5 Drawing Sheets

METHOD AND DEVICE FOR ASCERTAINING OR EVALUATING A SETPOINT TRAJECTORY OF A MOTOR VEHICLE

CROSS REFERENCE

The present application claims the benefit under 35 U.S.C. § 119 of German Patent Application No. DE 102015211926.2 filed on Jun. 26, 2015, which is expressly incorporated herein by reference in its entirety.

FIELD

The present invention relates to a method for ascertaining a setpoint trajectory of a motor vehicle. The present invention furthermore relates to a device, in particular a control unit, which is configured to carry out this method.

BACKGROUND INFORMATION

A method for controlling a driving power of a motor vehicle, which has a parallel or power-branched hybrid drive including at least one internal combustion engine, at least one electric machine, and at least one electrical energy store connected to the electric machine, is described in German Patent Application No. DE 10 2012 200 196 A1, the control of the driving power being carried out as a function of at least one specification, which determines a particular power request to the hybrid drive, of at least one movement parameter and/or one force and/or one torque, the specification of the at least one movement parameter and/or the force and/or the torque being delimited by at least one tolerance range, the control and/or the regulation of the driving power within the tolerance range furthermore also being carried out as a function of a present maximum possible driving power of the electric machine.

SUMMARY

In further aspects, the present invention relates to a computer program, a machine-readable storage medium, on which this computer program is stored, and a control and/or regulating unit.

According to a first aspect, the present invention relates to a method for ascertaining a setpoint trajectory of a motor vehicle, i.e., a setpoint curve of a speed of the motor vehicle. In this case, an initial setpoint trajectory is planned and transmitted to an evaluation unit (for example, a VCU). A curve of a power characteristic variable, which is implementable as a function of the initial setpoint trajectory, is received from the evaluation unit. These time curves may be coded as vectors, for example. This power characteristic variable may be in particular a torque and/or a physical power of the propulsion units, in particular the internal combustion engine and/or electric motors. The term "propulsion units" may be understood as worded so broadly here that it also includes decelerating units (i.e., units which negatively influence the propulsion), for example, an electric machine which recuperates kinetic energy. Subsequently, a corrected setpoint trajectory is ascertained as a function of the ascertained implementable curve of the power characteristic variable.

This has the advantage that limitations in the drivetrain of the motor vehicle may be taken into consideration adequately. The setpoint trajectory may thus be planned in such a way that the motor vehicle may be guided accurately along this setpoint trajectory.

The power characteristic variable is preferably ascertained at the wheel level, i.e., the power characteristic variable thus ascertained corresponds to the power characteristic variable which is transferred from the drive wheels of the motor vehicle to a roadway, on which the motor vehicle travels. However, it is alternatively also possible that the power characteristic variable is ascertained in such a way that its ascertained value corresponds to the value which is generated by the propulsion units.

The corrected setpoint trajectory does not necessarily differ from the initial setpoint trajectory. It may also assume an identical value.

According to another aspect, it may be provided that, in addition to the initial setpoint trajectory, an initial setpoint curve of the power characteristic variable is also ascertained and transmitted to the evaluation unit, for example, jointly with the setpoint trajectory. The received implementable curve of the power characteristic variable is also dependent on the ascertained initial setpoint curve of the power characteristic variable. In this case, the initial setpoint curve of the power characteristic variable corresponds to the initial setpoint trajectory. This means, the initial setpoint curve of the power characteristic variable is provided in such a way that the motor vehicle would follow the setpoint trajectory if the actual curve of the power characteristic variable corresponded to this setpoint curve. The consideration of limitations of the drivetrain is enabled particularly simply in this way.

According to another aspect, it may be provided that the received implementable curve of the power characteristic variable corresponds to the initial setpoint curve, however, restricted to a maximum power characteristic variable implementable by the motor vehicle. This means that the implementable curve of the power characteristic variable is provided in such a way that it corresponds to the initial curve of the setpoint trajectory and at points, at which the power characteristic variable cannot be implemented by the motor vehicle, it corresponds to the maximum value of the power characteristic variable which may be implemented by the motor vehicle. Limitations in the drivetrain are thus considered in a particularly simple manner.

According to another aspect, it may be provided that the implementable curve corresponds to a fuel-efficient implementation of the initial setpoint trajectory. This means that, when the actual curve of the power characteristic variable corresponds to the implementable curve, an overall energy consumption of the motor vehicle is minimized when travelling on the initial setpoint trajectory. In this way, an adaptation of the setpoint trajectory to different operating modes is enabled without structural changes in relation to the other aspects.

According to another aspect, it may be provided that the received implementable curve corresponds to the curve of a maximum power characteristic variable recuperable by a recuperation unit of the motor vehicle. Recuperation refers in this case, as usual, to the conversion of kinetic energy of the motor vehicle into energy which is stored in an energy store of the motor vehicle. This enables limits of the drivetrain with respect to a deceleration to also be able to be taken into consideration adequately.

According to another aspect, it may be provided that the ascertained implementable curve of the power characteristic variable is ascertained as a function of a friction coefficient of a roadway on which the motor vehicle travels. This may mean that when it is ascertained that the friction coefficient changes over the curve of the setpoint trajectory, the implementable curve is ascertained at each point of the setpoint trajectory as a function of the friction coefficient applicable at this point. The setpoint trajectory may thus be planned in such a way that the motor vehicle may be guided even more accurately along the setpoint trajectory.

According to another aspect, a method for evaluating the initial setpoint trajectory of the motor vehicle, which is received from a trajectory planning unit, may be provided, an implementable curve of the power characteristic variable being ascertained as a function of the initial setpoint trajectory and transmitted to the trajectory planning unit.

According to another aspect, it may be provided that, in addition to the initial setpoint trajectory, an initial setpoint curve of the power characteristic variable is also received and the implementable curve of the power characteristic variable is also ascertained as a function of the initial setpoint curve of the power characteristic variable.

According to another aspect, it may be provided that the implementable curve of the power characteristic variable corresponds to the initial setpoint curve of the power characteristic variable, which is restricted to a maximum power characteristic variable implementable by the motor vehicle.

According to another aspect, it may be provided that the implementable curve corresponds to a fuel-efficient implementation of the initial setpoint trajectory.

According to another aspect, it may be provided that the implementable curve corresponds to the curve of a maximum power characteristic variable recuperable by a recuperation unit of the motor vehicle.

According to another aspect, it may be provided that the ascertained implementable curve of the power characteristic variable is ascertained as a function of a friction coefficient of a roadway, on which the motor vehicle travels.

In other aspects, the present invention relates to a computer program for carrying out the method according to one of the above-mentioned aspects, a machine-readable storage medium on which this computer program is stored, and a control and/or regulating unit which carries out the method according to one of the above-mentioned aspects.

BRIEF DESCRIPTION OF EXAMPLE EMBODIMENTS

DETAILED DESCRIPTION OF EXAMPLE EMBODIMENTS

Figure 1:
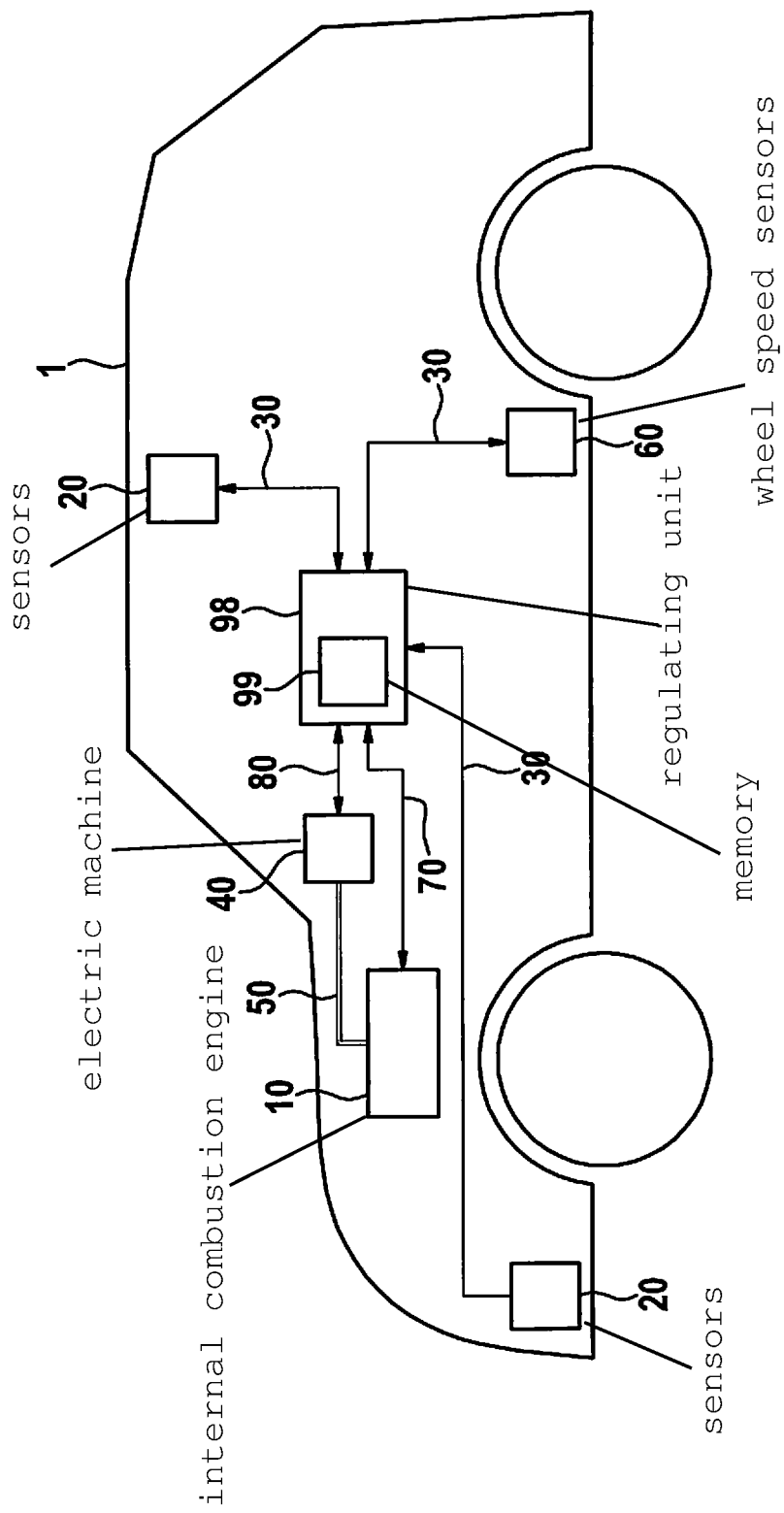
FIG. 1 shows a motor vehicle in which the present invention may be used.

FIG. 1 shows an exemplary motor vehicle 1, in which the present invention may be used. Motor vehicle 1 is driven by an internal combustion engine 10. However, the present invention may also be used in an electric vehicle, or in a motor vehicle having a hybridized drivetrain. It is not important in this case how the drive assemblies are provided. For example, it is also possible to use the present invention in a motor vehicle which is hybridized with the aid of a pneumatic system, or in a motor vehicle which is driven with the aid of a gas turbine. In the exemplary embodiment, an electric machine 40 is coupled via a mechanical coupling 50 (for example, a belt drive) to the crankshaft (not shown) of internal combustion engine 10. Electric machine 40 is operable as a generator and is coupled to a battery (not shown), into which it may feed electrical energy. Sensors 20 detect the surroundings of motor vehicle 1. The sensors communicate via communication connections 30 with a control and/or regulating unit 98. Wheel speed sensors 60 detect speeds of one or multiple wheels of motor vehicle 1 and also communicate with control and/or regulating unit 98 via communication connections 30. Control and/or regulating unit 98 controls electric machine 40 via a communication connection 80 and internal combustion engine 10 via a communication connection 70. Control and/or regulating unit 98 includes a machine-readable storage medium 99, for example, a RAM memory, on which programs are stored, which carry out the control of electric machine 40 and internal combustion engine 10 and evaluate the sensor signals of sensors 20, 30. It is obvious to those skilled in the art that not all of these functions have to be implemented on a control and/or regulating unit 98. It is also possible that the functions are distributed onto a plurality of control and/or regulating units.

Figure 2:
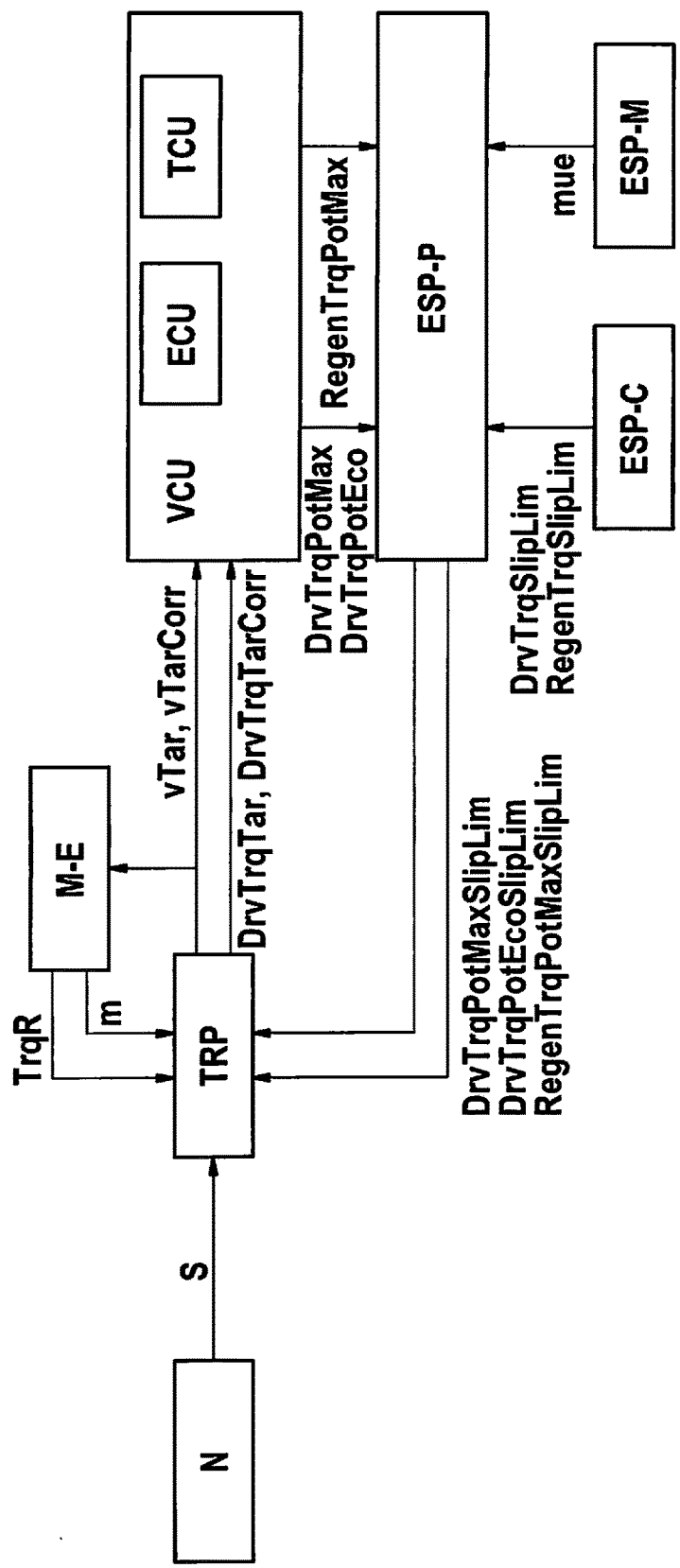
FIG. 2 shows a structure diagram of signal flows according to one specific embodiment of the present invention.

FIG. 2 shows a structure diagram in which signal flows according to one specific embodiment of the present invention are shown. A trajectory planning unit TRP is a central functional module for planning trajectories for the autonomous operation of motor vehicle 1. It plans a trajectory based on various functions and pieces of information which are generally known to those skilled in the art (for example, on the basis of sensor signals of sensors 20, 30). This trajectory may be used as described in German Patent Application No. DE 10 2012 200 196 A1, for example, to adjust a position of autonomously operated motor vehicle 1.

Trajectory planning unit TRP determines, for example, on the basis of a setpoint curve of a position of motor vehicle 1, an initial setpoint curve of a speed of motor vehicle 1. This initial setpoint curve of the speed of motor vehicle 1 as a function of time is also designated in the context of the present invention as initial setpoint trajectory vTar. Initial setpoint trajectory vTar does not necessarily have to be parameterized as a function of time—nor do all trajectories introduced hereafter. Any other parameterization is also conceivable, using which the future curve of the trajectory may be mathematically represented as a curve. In particular, it is possible that these or some of the trajectories may be parameterized as a function of the location (because the corresponding profile may also be calculated, from the initial setpoint trajectory as a function of time, as a function of the location, proceeding from a known starting point). The following consideration preferably relates to the driving route to be traveled immediately by motor vehicle 1. The approached position control extends to the close range or the planning horizon of motor vehicle 1. A typical such planning horizon may include, for example, the next 300 m or, for example, (depending on the speed of motor vehicle 1) a predictive horizon of up to 20 seconds. The area ahead of motor vehicle 1, which may be detected using typical motor vehicle sensors 20 for object recognition, is therefore covered.

Trajectory planning unit TRP optionally receives a height profile S from a navigation device N. Furthermore, the trajectory planning unit optionally receives, for example, from a mass estimator M-E, an estimated value m of the mass of the motor vehicle and optionally a curve TrqR of external driving resistances.

With incorporation of height profile S and/or estimated value of mass m and/or curve TrqR of external driving resistances, trajectory planning unit TRP optionally also determines an initial setpoint curve DrvTrqTar of a power characteristic variable. A torque is selected hereafter as a power characteristic variable, for example. As described, however, other power characteristic variables are also conceivable. Trajectory planning unit TRP thus optionally ascertains the setpoint curve of drive torque DrvTrqTar as a function of time.

Initial setpoint trajectory vTar and optional setpoint curve of drive torque DrvTrqTar are transmitted by trajectory planning unit TRP to an evaluation unit VCU. Evaluation unit VCU includes an engine control unit ECU and optionally a transmission control unit TCU. Engine control unit ECU ascertains, as a function of initial setpoint trajectory vTar, the curve provided during initial setpoint trajectory vTar of a maximum torque DrvTrqPotMax transmittable from internal combustion engine 10 and/or electric machine 40 and/or the fuel-efficient curve of torques DrvTrqPotEco and/or the curve of maximum torque RegenTrqPotMax recuperable by electric machine 40.

This determination may be carried out, for example, in that operating points of internal combustion engine 10 and/or electric machine 40 are ascertained along initial setpoint trajectory vTar. Transmission control unit TCU may ascertain a gear to be selected of an automatic transmission of motor vehicle 1, which may then also be incorporated into the determination. The allocation of the torques to be supplied between internal combustion engine 10 and electric machine 40 may be carried out in such a way that the total torque transferred to the roadway is maximized (in the case of the determination of maximum implementable setpoint curve of drive torque DrvTrqPotMax), or the allocation results in a fuel-efficient operating strategy (in the case of the determination of the fuel-efficient curve of drive torque DrvTrqPotEco).

Maximum implementable setpoint curve of drive torque DrvTrqPotMax is thus a predictively ascertained curve of a control reserve of drive 10, 40 of motor vehicle 1. The area between maximum implementable setpoint curve of drive torque DrvTrqPotMax and fuel-efficient curve of drive torque DrvTrqPotEco supplies, for example, the range for the planning of an "emergency trajectory" for possible emergency situations.

By way of the use of suitable filters, for example, in evaluation unit VCU, it is possible to also take into consideration possible limitations of internal combustion engine 10 and/or electric machine 40 in the event of torque changes. Comfort aspects and component protection may also be ensured by suitable filters.

It is possible that the evaluation unit returns the maximum implementable setpoint curve of drive torque DrvTrqPotMax and/or the fuel-efficient curve of drive torque DrvTrqPotEco and/or the curve of maximum recuperable torque RegenTrqPotMax to trajectory planning unit TRP.

However, it is also possible that these variables are transmitted to a delimitation unit ESP-P. This delimitation unit ESP-P may preferably be implemented in an ESP control unit. Delimitation unit ESP-P may receive, from a wheel slip regulator ESP-C, a curve of a slip limit of drive torque DrvTrqSlipLim and/or a slip limit of recuperable torque RegenTrqSlipLim. In addition, these wheel slip controllers limit the particular drive torques if needed, so that the predefined slip limits are maintained. This enables a friction coefficient mue to be taken into consideration implicitly while maintaining the driving stability. However, it is alternatively or additionally also possible that delimitation unit ESP-P receives an estimated curve of friction coefficient mue transmitted from a friction coefficient estimator ESP-M. Friction coefficient estimator ESP-M is itself to estimate the curve of friction coefficient mue with the aid of an algorithm. However, it is also possible that it has the friction coefficient transmitted thereto from an external database. This external database is stored on a computer, for example, which friction coefficient estimator ESP-M may access via a data transmission (for example, a wireless network). It is possible in particular that friction coefficients are stored in this database, which were ascertained on the basis of feedback from other motor vehicles to the database.

Delimitation unit ESP-P may therefore correct the maximum implementable setpoint curve of drive torque DrvTrqPotMax and/or the fuel-efficient curve of drive torque DrvTrqPotEco and/or the curve of maximum recuperable torque RegenTrqPotMax by way of control interventions to be expected from vehicle dynamics controllers such as a wheel slip controller or a drag torque controller. Delimitation unit ESP-P then transmits a corrected maximum implementable setpoint curve of drive torque DrvTrqPotMaxSlipLim and/or a corrected fuel-efficient curve of drive torque DrvTrqPotEcoSlipLim and/or a corrected curve of maximum recuperable torque RegenTrqPotMaxSlipLim to trajectory planning unit TRP.

As a function of the returned curves, trajectory planning unit TRP may correct initial setpoint trajectory vTar to form a corrected setpoint trajectory vTarCorr and may optionally correct the initial setpoint curve of drive torque DrvTrqTar to form a corrected setpoint curve of drive torque DrvTrqTarCorr. The method may be iterated using these corrected methods, optionally also multiple times.

Figure 3:
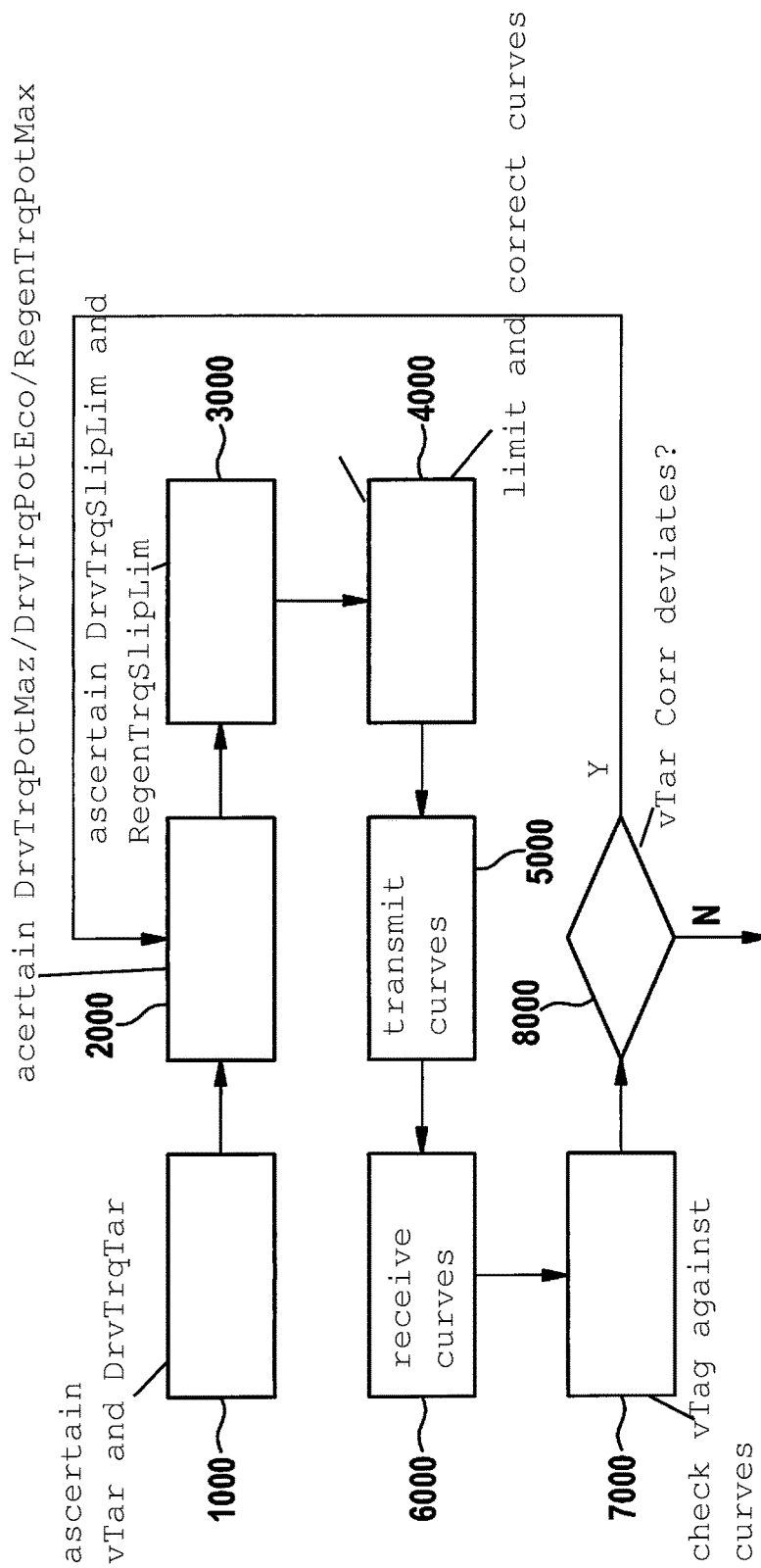
FIG. 3 shows a flow chart which illustrates an overall method for planning and evaluating the setpoint trajectory.

FIG. 3 illustrates, in a flow chart, the sequence of the overall method according to one specific embodiment of the present invention. In step 1000, the initial setpoint trajectory vTar and the initial setpoint curve of drive torque DrvTrqTar are ascertained over the prediction duration. In following step 2000, the maximum implementable setpoint curve of drive torque DrvTrqPotMax and/or the fuel-efficient curve of drive torque DrvTrqPotEco and/or the curve of maximum recuperable torque RegenTrqPotMax are ascertained therefrom, optionally taking into consideration the gear to be selected in the transmission.

In following step 3000, possible controller interventions to maintain the driving stability are ascertained and the curves of the slip limit of drive torque DrvTrqSlipLim and the slip limit of recuperable torque RegenTrqSlipLim are thus ascertained.

In following step 4000, the maximum implementable curve of drive torque DrvTrqPotMax and the fuel-efficient curve of power characteristic variable DrvTrqPotEco are limited to values less than the slip limit of drive torque DrvTrqSlipLim, and the corrected maximum implementable curve of drive torque DrvTrqPotMaxSlipLim and the corrected fuel-efficient curve of drive torque DrvTrqPotEcoSlipLim are thus ascertained. The curve of maximum recuperable torque RegenTrqPotMax is also limited to values less than the slip limit of recuperable torque RegenTrqSlipLim and the corrected curve of maximum recuperable torque RegenTrqPotMaxSlipLim is thus ascertained.

These corrected curves are transmitted in step 5000 to trajectory planning unit TRP and received in step 6000 by the trajectory planning unit. In step 7000, trajectory planning unit TRP checks initial setpoint trajectory vTar with consideration of the received torque curves. If the initial setpoint curve of drive torque DrvTrqTar exceeds the corrected maximum implementable curve of drive torque DrvTrqPotMaxSlipLim, a corrected setpoint trajectory vTarCorr is thus ascertained and checked, for example, for collision freedom by trajectory planning unit TRP. For example, a corrected setpoint curve of drive torque DrvTrqTarCorr may be determined in such a way that this setpoint curve assumes values at every point in time which are less than the values of the initial setpoint curve of drive torque DrvTrqTar and of the corrected maximum implementable curve of drive torque DrvTrqPotMaxSlipLim. Corrected setpoint trajectory vTarCorr is ascertained from this corrected setpoint curve of drive torque DrvTrqTarCorr.

In step 8000, it is checked whether corrected setpoint trajectory vTarCorr deviates from initial setpoint trajectory vTar. If this is not the case (output "N"), the trajectory planning ends in step 9000 and initial setpoint trajectory vTar is implemented. In contrast, if this is the case (output "Y"), corrected setpoint trajectory vTarCorr, for example, after checking for collision freedom or other possible corrections by trajectory planning unit TRP, replaces initial setpoint trajectory vTar and corrected curve of drive torque DrvTrqTarCorr replaces initial curve of drive torque DrvTrqTar, and the method branches back to step 2000.

Figure 4:
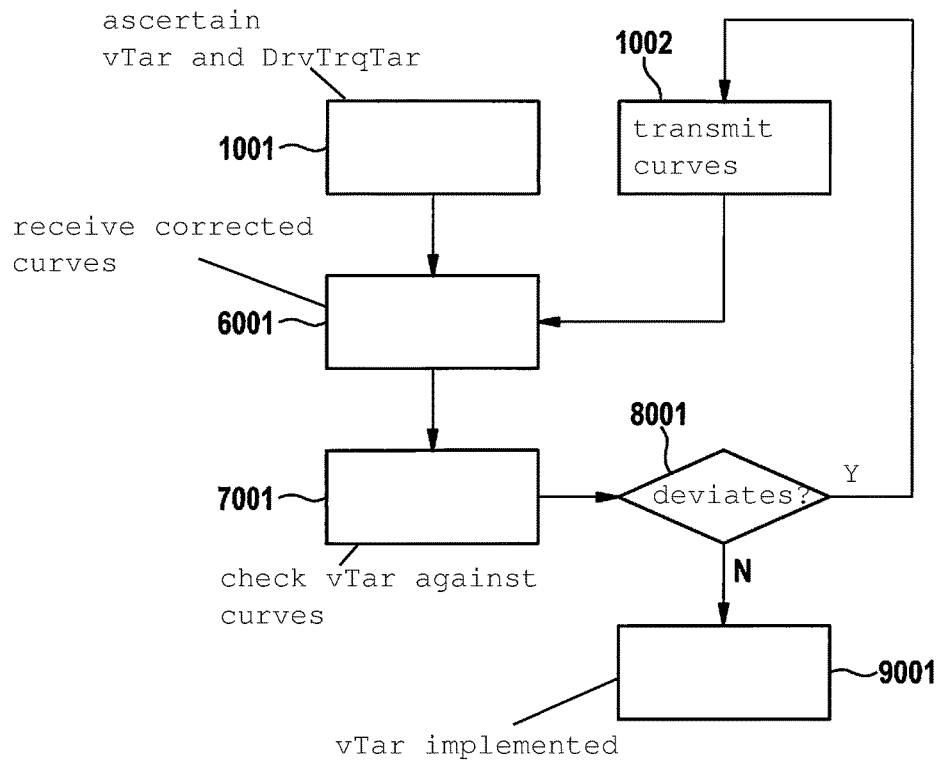
FIG. 4 shows a flow chart which illustrates a method for planning the setpoint trajectory.

FIG. 4 illustrates, in a flow chart, the sequence of the part of the method illustrated in FIG. 3 which is executed in trajectory planning unit TRP.

In a step 1001, initial setpoint trajectory vTar and initial setpoint curve of drive torque DrvTrqTar are ascertained over the prediction duration.

In following step 2000, which is not executed in trajectory planning unit TRP in this exemplary embodiment and is therefore not shown in FIG. 4, the maximum implementable setpoint curve of drive torque DrvTrqPotMax and the fuel-efficient curve of the power characteristic variable DrvTrqPotEco and the curve of maximum recuperable torque RegenTrqPotMax are ascertained therefrom, optionally with consideration of the gear of the transmission to be selected. These curves are transmitted to evaluation unit VCU.

In step 6001, the corrected maximum implementable curve of drive torque DrvTrqPotMaxSlipLim and the corrected fuel-efficient curve of drive torque DrvTrqPotEcoSlipLim and the corrected curve of maximum recuperable torque RegenTrqPotMaxSlipLim are received.

In step 7001, trajectory planning unit TRP checks initial setpoint trajectory vTar with consideration of the received torque curves as described in step 7000.

In step 8001, it is checked whether corrected setpoint trajectory vTarCorr deviates from initial setpoint trajectory vTar. If this is not the case (output "N"), the trajectory planning ends in step 9001 and initial setpoint trajectory vTar is implemented. In contrast, if this is the case (output "Y"), the corrected setpoint trajectory vTarCorr replaces the initial setpoint trajectory vTar and the corrected curve of drive torque DrvTrqTarCorr replaces the initial curve of drive torque DrvTrqTar. The method branches to step 1002, in which these curves are transmitted to evaluation unit VCU, and continues with step 6001.

Figure 5:
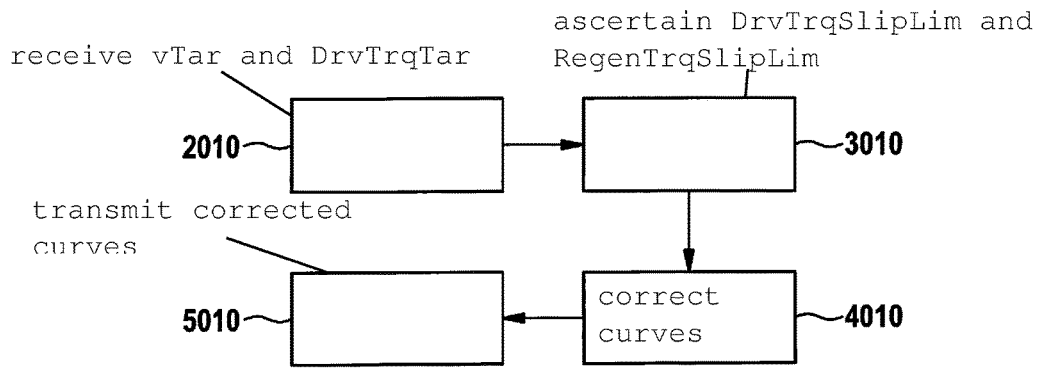
FIG. 5 shows a flow chart which illustrates a method for evaluating the setpoint trajectory.

FIG. 5 illustrates, in a flow chart, the sequence of the part of the method illustrated in FIG. 3, which is carried out in evaluation unit VCU or delimitation unit ESP-P.

In step 2010, the initial setpoint trajectory vTar and the initial setpoint curve of drive torque DrvTrqTar are received.

The maximum implementable setpoint curve of drive torque DrvTrqPotMax and the fuel-efficient curve of the power characteristic variable DrvTrqPotEco and the curve of maximum recuperable torque RegenTrqPotMax are ascertained therefrom, optionally with consideration of the gear of the transmission to be selected.

In step 3010, possible controller interventions to maintain the driving stability are ascertained and therefore the curves of the slip limit of drive torque DrvTrqSlipLim and the slip limit of recuperable torque RegenTrqSlipLim are ascertained.

In step 4010, the maximum implementable setpoint curve of drive torque DrvTrqPotMax and the fuel-efficient curve of the power characteristic variable DrvTrqPotEco are limited to values less than the slip limit of drive torque DrvTrqSlipLim, as described in step 4000.

These corrected curves are transmitted in step 5010 to trajectory planning unit TRP. This part of the method thus ends.

Trajectory planning unit TRP, evaluation unit VCU, engine control unit ECU, transmission control unit TCU, ESP control unit ESP-C, friction coefficient estimator ESP-M, and mass estimator M-E may be implemented on control and/or regulating unit 98, or distributed onto a plurality of control and/or regulating units 98.

Figure 6:
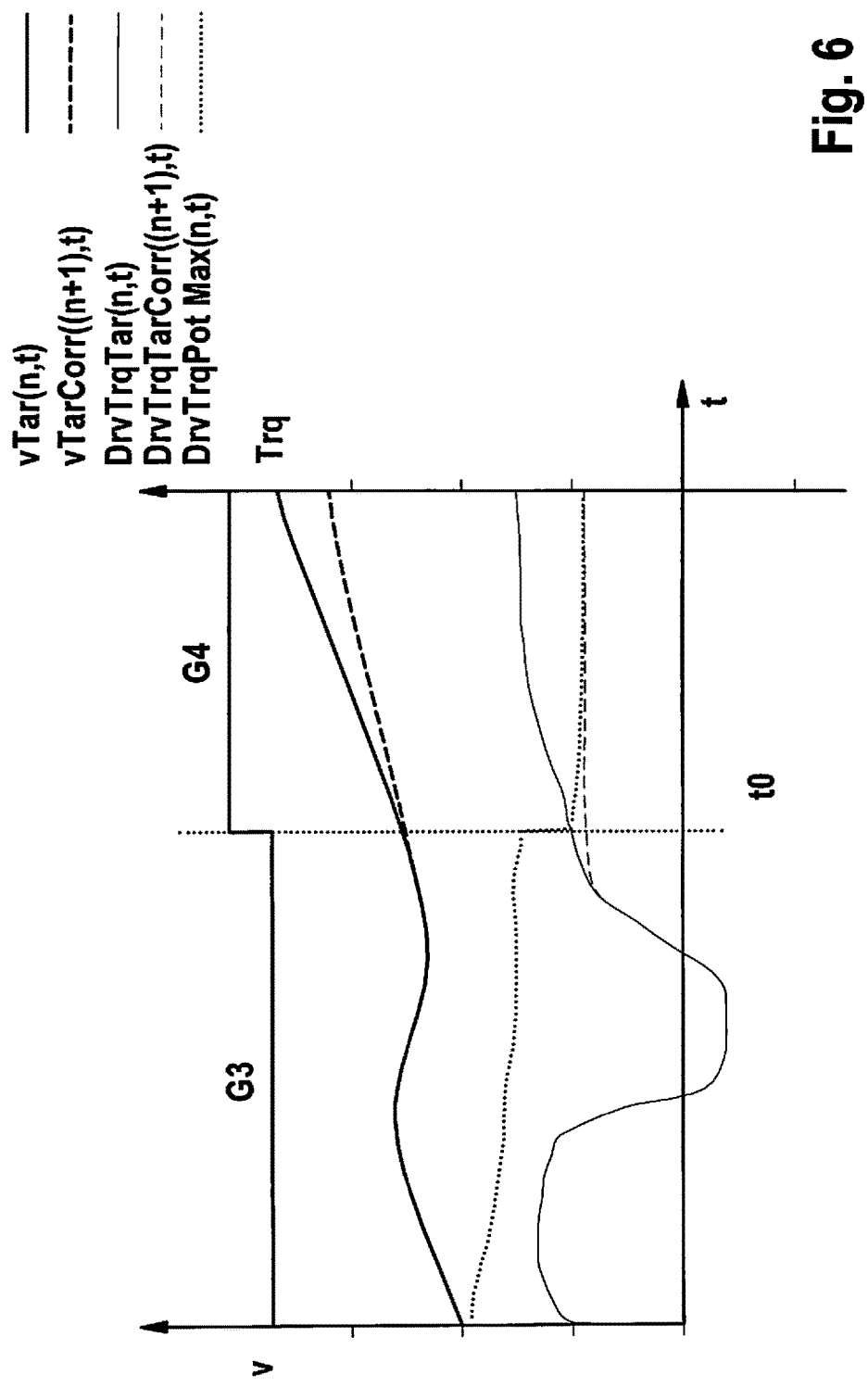
FIG. 6 shows time curves of setpoint trajectories and setpoint curves of a power characteristic variable.

FIG. 6 shows an example of the curve of initial setpoint trajectory vTar, corrected setpoint trajectory vTarCorr, initial setpoint curve of drive torque DrvTrqTar, corrected setpoint curve of drive torque DrvTrqTarCorr, and maximum implementable curve of drive torque DrvTrqPotMax. Speed v and drive torque Trq are shown over time t. An acceleration procedure over a prediction range of, for example, 10 seconds is shown.

At a point in time t0, transmission control unit TCU predicts that the gear of the transmission will be shifted from third gear G3 into fourth gear G4. This results in a reduction of the maximum implementable drive torque DrvTrqPotMax at point in time t0. The initial setpoint curve of the drive torque therefore exceeds the maximum implementable drive torque DrvTrqPotMax at point in time t0 and is thus no longer available after this point in time t0. Trajectory planning unit TRP recognizes this deviation and carries out re-planning of the setpoint trajectory based on the curve of maximum implementable drive torque DrvTrqPotMax, i.e., the initial setpoint trajectory vTar is replaced by a corrected setpoint trajectory vTarCorr. The corrected setpoint curve DrvTrqTarCorr is ascertained therefrom, which assumes smaller values for points in time t>t0, for example, than initially requested drive torque DrvTrqTar and also than the maximum implementable drive torque DrvTrqPotMax. The corrected setpoint trajectory vTarCorr may therefore also actually be implemented with very high probability.

What is claimed is:

1. A method for ascertaining a setpoint trajectory of a motor vehicle, the method comprising:
    transmitting, via a trajectory planning (TRP) unit having a processor, an initial setpoint trajectory to an evaluation unit, which is of a vehicle control unit;
    receiving, via an engine control unit of the evaluation unit, a curve of a power characteristic variable, which is implementable as a function of the initial setpoint trajectory;
    determining, via the trajectory planning (TRP) unit, a corrected setpoint trajectory as a function of the implementable curve of the power characteristic variable; and controlling, via the engine control unit, a propulsion unit of the motor vehicle based on the implementable curve of the power characteristic variable;

wherein the evaluation unit includes at least the engine control unit, wherein the initial setpoint trajectory represents an initial setpoint curve of a speed of the motor vehicle, wherein the power characteristic variable is a torque and/or a physical power of a propulsion unit of the motor vehicle, wherein the trajectory planning (TRP) unit transmits the initial setpoint trajectory to the evaluation unit, wherein the TRP unit receives at least one of a height profile from a navigation device, an estimated mass of the motor vehicle from a mass estimator, a curve of external driving resistances, and wherein the TRP unit determines the curve of the power characteristic variable, and wherein the vehicle is operated according to the ascertained setpoint trajectory.

2. The method as recited in claim 1, further comprising: transmitting to the evaluation unit an initial setpoint curve of the power characteristic variable, wherein the received implementable curve of the power characteristic variable is a function of the ascertained initial setpoint curve of the power characteristic variable.

3. The method as recited in claim 2, wherein the received implementable curve of the power characteristic variable corresponds to an initial setpoint curve of the power characteristic variable which is restricted to a maximum power characteristic variable implementable by the motor vehicle.

4. The method as recited in claim 1, wherein the implementable curve corresponds to a fuel-efficient implementation of the initial setpoint trajectory.

5. The method as recited in claim 1, wherein the received implementable curve corresponds to a curve of a maximum power characteristic variable recuperable by a recuperation unit of the motor vehicle.

6. The method as recited in claim 1, wherein the implementable curve of the power characteristic variable is ascertained as a function of a friction coefficient of a roadway on which the motor vehicle is traveling.

7. A non-transitory machine-readable storage medium having a computer program, which is executable by a processor, comprising:

a program code arrangement having program code for ascertaining a setpoint trajectory of a motor vehicle, by performing the following:

transmitting, via a trajectory planning (TRP) unit having the processor, an initial setpoint trajectory to an evaluation unit, which is of a vehicle control unit;

receiving, via an engine control unit of the evaluation unit, a curve of a power characteristic variable, which is implementable as a function of the initial setpoint trajectory;

determining, via the trajectory planning (TRP) unit, a corrected setpoint trajectory as a function of the implementable curve of the power characteristic variable; and controlling, via the engine control unit, a propulsion unit of the motor vehicle based on the implementable curve of the power characteristic variable;

wherein the evaluation unit includes at least the engine control unit, wherein the initial setpoint trajectory represents an initial setpoint curve of a speed of the motor vehicle, wherein the power characteristic variable is a torque and/or a physical power of a propulsion unit of the motor vehicle, wherein the trajectory planning (TRP) unit transmits the initial setpoint trajectory to the evaluation unit, wherein the TRP unit receives at least one of a height profile from a navigation device, an estimated mass of the motor vehicle from a mass estimator, a curve of external driving resistances, and wherein the TRP unit determines the curve of the power characteristic variable, and wherein the vehicle is operated according to the ascertained setpoint trajectory.

8. A control device for ascertaining a setpoint trajectory of a motor vehicle, comprising:

a control unit configured to perform the following:

transmitting, via a trajectory planning (TRP) unit having a processor, an initial setpoint trajectory to an evaluation unit, which is of a vehicle control unit;

receiving, via an engine control unit of the evaluation unit, a curve of a power characteristic variable, which is implementable as a function of the initial setpoint trajectory;

determining, via the trajectory planning (TRP) unit, a corrected setpoint trajectory as a function of the implementable curve of the power characteristic variable; and controlling, via the engine control unit, a propulsion unit of the motor vehicle based on the implementable curve of the power characteristic variable;

wherein the evaluation unit includes at least the engine control unit, wherein the initial setpoint trajectory represents an initial setpoint curve of a speed of the motor vehicle, wherein the power characteristic variable is a torque and/or a physical power of the propulsion unit of the motor vehicle, wherein the trajectory planning (TRP) unit transmits the initial setpoint trajectory to the evaluation unit, wherein the TRP unit receives at least one of a height profile from a navigation device, an estimated mass of the motor vehicle from a mass estimator, a curve of external driving resistances, and wherein the TRP unit determines the curve of the power characteristic variable, and wherein the vehicle is operated according to the ascertained setpoint trajectory.

* * * * *